US008624722B2

(12) United States Patent
Miller et al.

(10) Patent No.: US 8,624,722 B2
(45) Date of Patent: Jan. 7, 2014

(54) SYSTEMS, APPARATUS, AND METHODS FOR PROVIDING AND DETECTING INFORMATION REGARDING A PERSON, LOCATION, OR OBJECT

(75) Inventors: Julie L. Miller, Auberry, CA (US); Liang Chu, Sunnyvale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 742 days.

(21) Appl. No.: 12/270,733

(22) Filed: Nov. 13, 2008

(65) Prior Publication Data
US 2010/0117906 A1  May 13, 2010

(51) Int. Cl.
*G08B 1/08* (2006.01)
(52) U.S. Cl.
USPC .............. 340/539.1; 340/539.13; 340/539.32; 340/573.1; 340/573.3
(58) Field of Classification Search
None
See application file for complete search history.

(56) References Cited

U.S. PATENT DOCUMENTS

| 4,262,632 | A | * | 4/1981 | Hanton et al. | 119/51.02 |
|---|---|---|---|---|---|
| 4,313,119 | A | * | 1/1982 | Garay et al. | 343/702 |
| 4,742,357 | A | * | 5/1988 | Rackley | 342/457 |
| 6,366,206 | B1 | * | 4/2002 | Ishikawa et al. | 340/573.1 |
| 2004/0012518 | A1 | * | 1/2004 | Mohan | 342/357.1 |
| 2004/0085209 | A1 | * | 5/2004 | Schmidt et al. | 340/573.4 |
| 2004/0155772 | A1 | * | 8/2004 | Medema et al. | 340/539.12 |
| 2004/0174258 | A1 | * | 9/2004 | Edelstein et al. | 340/539.13 |
| 2005/0041758 | A1 | * | 2/2005 | Rosen | 375/316 |
| 2005/0128074 | A1 | * | 6/2005 | Culpepper et al. | 340/539.1 |
| 2006/0061472 | A1 | * | 3/2006 | Lovoi et al. | 340/572.1 |
| 2006/0255131 | A1 | * | 11/2006 | Stewart | 235/383 |
| 2007/0268138 | A1 | * | 11/2007 | Chung et al. | 340/572.1 |
| 2008/0231434 | A1 | * | 9/2008 | Hermann | 340/431 |
| 2009/0124871 | A1 | * | 5/2009 | Arshak et al. | 600/302 |

* cited by examiner

*Primary Examiner* — Benjamin C Lee
*Assistant Examiner* — Curtis King
(74) *Attorney, Agent, or Firm* — McDermott Will & Emery LLP

(57) ABSTRACT

An apparatus for providing and detecting information regarding a person, location, or object includes a power supply, a helicoil dipole antenna, a transmitter, a receiver configured to receive signals from remote transmitters at a designated frequency, a computer processor, and a memory device configured to store an identifier associated with the apparatus. Logic instructions embedded on the memory device are configured to compare an identifier decoded from received signals to the identifier associated with the apparatus. When the identifier decoded matches the identifier associated with the apparatus, the instructions decode a return frequency from the signal, and generate return signals. The return signals include the identifier associated with the apparatus, the transmitter is activated only when the transmitter transmits the return signals at the return frequency.

18 Claims, 13 Drawing Sheets

- 8 bits for heartbeat: $2^8$ = 256 increments between 0 and 255 beats/min
  (1 beat per minute resolution)

- 5 bits for body temp: $2^5$ = 32 increments between 80°F and 110°F
  (~1° F resolution)

- 1 bit flag for unauthorized transfer (detected from heart rate cessation)

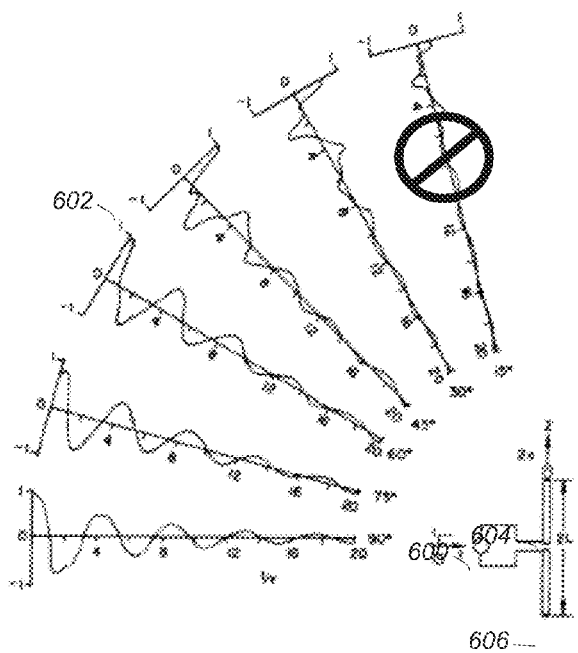
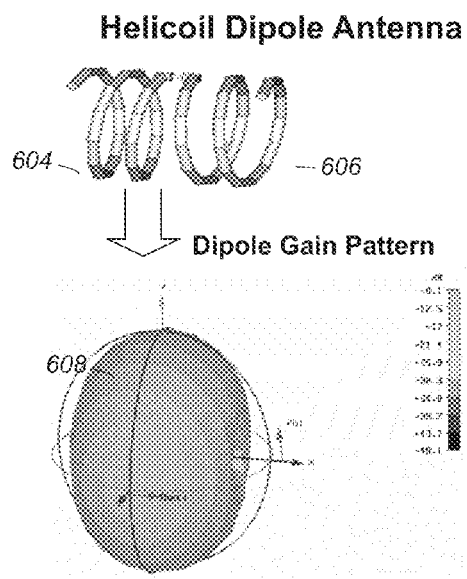
FIG. 6A
FIG. 6B
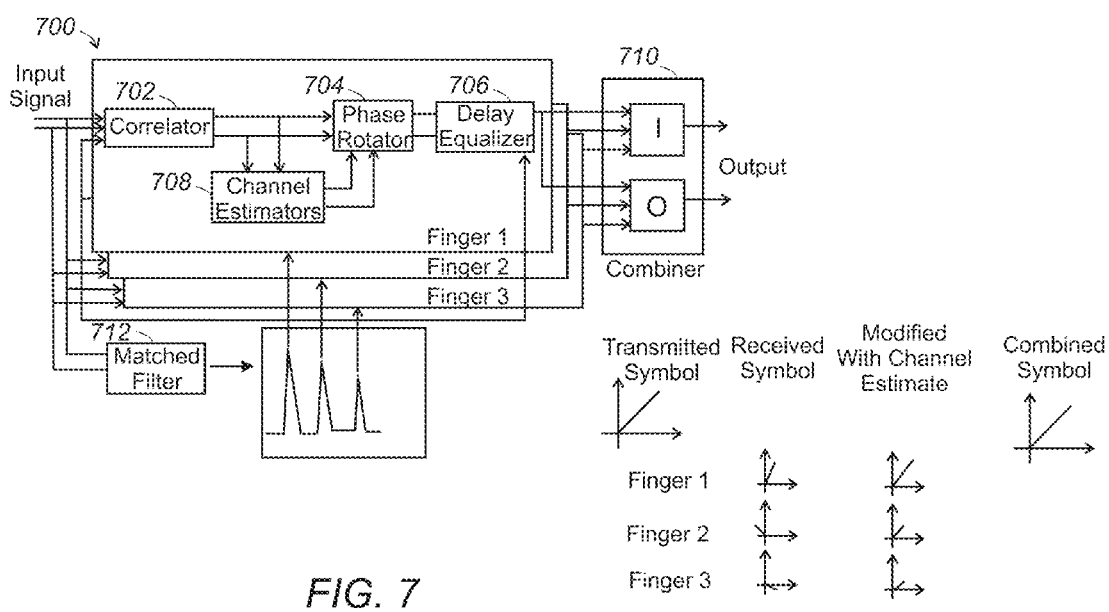
FIG. 7

SYSTEMS, APPARATUS, AND METHODS FOR PROVIDING AND DETECTING INFORMATION REGARDING A PERSON, LOCATION, OR OBJECT

BACKGROUND

There are often instances when a person or object cannot be found, such as a missing person or pet; a stolen automobile; and objects lost en route during shipping, among others. This can be especially true if the person or object is located in a building or underground. Additionally, in other situations, it is difficult to identify areas with overcrowding and traffic congestion during large gatherings and events, potentially preventing resources from being deployed where they are needed most for crowd and traffic control. In still other situations, it is difficult to detect and monitor the presence of particular substances or environmental conditions at a given location. Further, some systems for locating persons or objects use devices that are easily detected and removed, thereby thwarting recovery efforts.

SUMMARY

An apparatus includes a power supply, a helicoil dipole antenna, a transmitter, a receiver configured to receive signals from remote transmitters at a designated frequency, a computer processor, and a memory device configured to store an identifier associated with the apparatus. Logic instructions embedded on the memory device are configured to compare an identifier decoded from received signals to the identifier associated with the apparatus. When the identifier decoded matches the identifier associated with the apparatus, the instructions decode a return frequency from the signal, and generate return signals. The return signals include the identifier associated with the apparatus, the transmitter is activated only when the transmitter transmits the return signals at the return frequency.

BRIEF DESCRIPTION OF THE DRAWINGS

Embodiments disclosed herein may be better understood, and their numerous objects, features, and advantages made apparent to those skilled in the art by referencing the accompanying drawings. The use of the same reference symbols in different drawings indicates similar or identical items.

FIG. 6A depicts a schematic diagram of an embodiment of a helicoil dipole antenna that can be included in the capsule of FIG. 3 and a series of graphs indicated the performance of a quadrant of the antenna at fifteen degree intervals.

FIG. 6B depicts diagram of an embodiment of a helicoil dipole antenna of FIG. 6A and a three-dimensional graph of the dipole gain pattern.

FIG. 7 depicts a block diagram of an embodiment of a rake filter that may be used in the capsule of FIG. 3.

DETAILED DESCRIPTION OF THE FIGURES

Embodiments of systems and methods disclosed herein provide a rapid search and recovery/tracking system for persons and objects. In some embodiments, the system can include a small capsule used as a logistics tag that is hidden in or on a person or objects to track location of the person/object. In some form factors, the capsule is small enough to be ingested by a person, sewn into clothing, or implanted beneath a person's skin. A search platform communicates with the capsule and can include a phased array antenna that uses triangulation to locate the capsule. A unique identifier is associated with the person or object, and included in messages between the capsule and the search platform while the location of the capsule is being determined. The unique identifier associated with the capsule allows the search platform to discern messages from particular capsules from other capsules. A transmitter in the capsule can remain dormant until the capsule receives a message with the correct identifier to reduce the possibility of the capsule being detected electronically and removed. The message may also specify a return frequency to use when transmitting messages from the capsule to the search platform. In other embodiments, one or more capsules can be configured to provide information about an environment. The capsules can include one or more sensor devices, and sensed information can be provided to a search platform or control center. Other features and capabilities are described further with reference to the figures.

Figure 1:
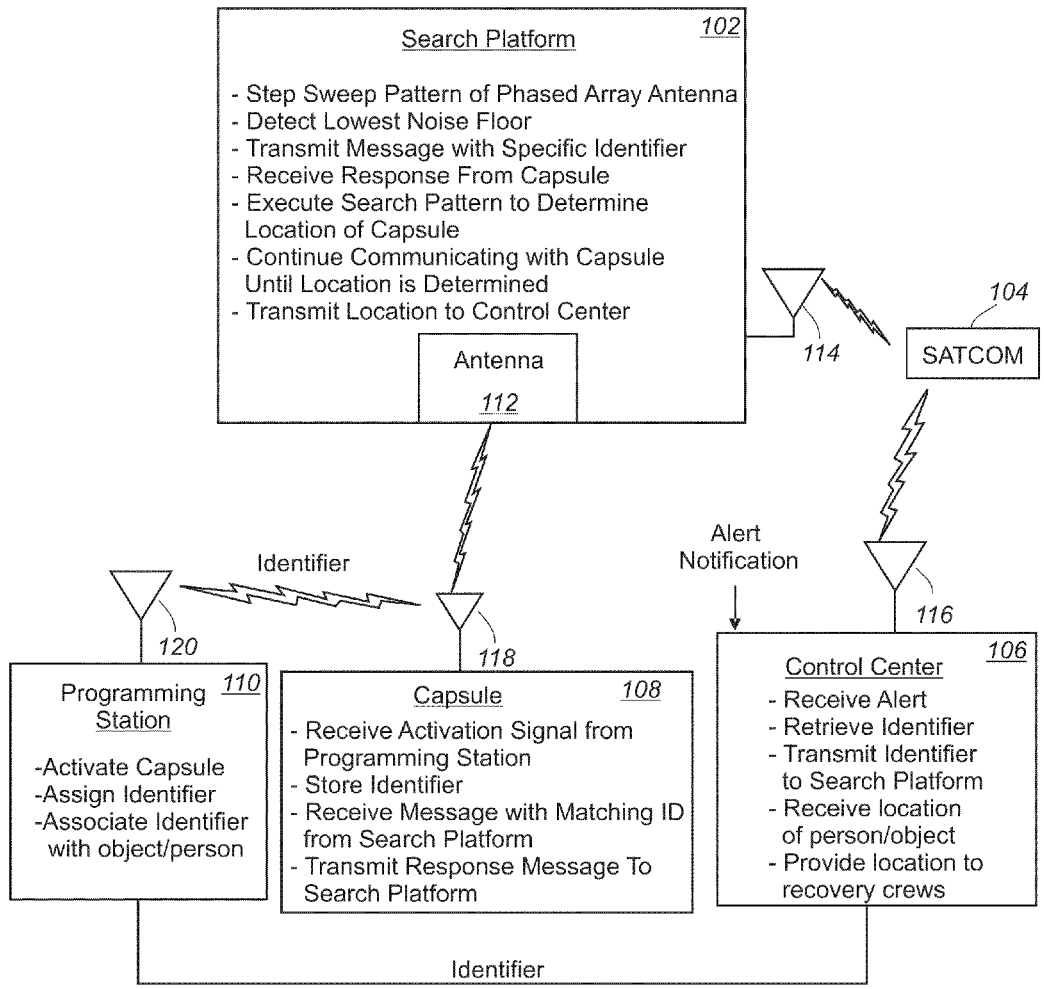
FIG. 1 is a block diagram of an embodiment of a system for providing and detecting information regarding a person, location, or object.

FIG. 1 shows an embodiment of a system 100 that can be used to provide and detect information to locate a lost person or object or detect information transmitted from a known, or predetermined, location. System 100 can include search platform 102, communication platform 104, control center 106, capsule 108, and programming station 110. Search platform 102 can be configured with antenna 112 that typically includes an antenna to communicate with capsule 108, and with antenna 114 to communication with control center 106 via communication platform 104.

Programming station 110 can be co-located with control center 106 or coupled to communicate with control center 106 via a suitable communication link such as any one or combination of wireless or plain old telephone service, T1, ISDN, or cable line, a wireless connection through a cellular or satellite network, or a local data transport system such as Ethernet or token ring over a local area network. A user or automated program of programming station 110 can issue a command to activate a power supply in capsule 108. In some embodiments, capsule 108 includes a switch, such as a Micro-electromechanical relay switch, ("MEMS") coupled to a power supply such as a battery. The power supply becomes active and supplies power to the components in capsule 108 when the MEMS switch is closed in response to an electrical or radio signal. Once the capsule 108 is active, a unique address is assigned to the capsule 108 and the address is associated with the object or person according to an identifier of the person or object, such as a unique name or identification number. The associated identifier data may be stored in memory coupled to programming station 110. Programming station 110 can supply the address of the capsule to control center 106 when control center 106 sends a request that includes the identifier data of the person or object.

Control center 106 is configured to receive a lost person or object alert, send a request for the address corresponding to the capsule 108 assigned to the person or object to programming station 104, receive a response from programming station 104 that includes the capsule address, transmit the capsule address to search platform 102, receive the location of the lost person or object from search platform 102, and provide the location of the person or object to recovery crews.

Search platform 102 can receive the capsule address from the control center 106, generate a search pattern, encrypt and transmit the capsule address in a message to capsule 108, receive and decrypt the capsule address from capsule 108, modify a search pattern, locate the person or object, and transmit information regarding the location of the person or object.

The various functions, processes, methods, and operations performed or executed by system 100 can be implemented as programs that are executable on various types of processing units such as controllers, central processing units, microprocessors, digital signal processors, state machines, programmable logic arrays, and the like. Processing units may be included in search platform 102, programming station 110, capsule 108, and/or control center 106.

Programs or logical instructions can be stored on any computer-readable medium or memory device for use by or in connection with any computer-related system or method. A computer-readable medium is an electronic, magnetic, optical, or other physical memory device or means that can contain or store a computer program such as a program or logical instructions for use by or in connection with search platform 102, programming station 110, capsule 108, and/or control center 106, method, process, or procedure. A computer readable medium may be found in search platform 102, programming station 110, capsule 108 and/or control center 106. Programs can be embodied in logic instructions that are executed by a computer-readable medium for use by or in connection with an instruction execution system, device, component, element, or apparatus, such as a system based on a computer or processor, or other system that can fetch instructions from an instruction memory or storage of any appropriate type. Logic instructions can be implemented using any suitable combination of hardware, software, and/or firmware, such as microprocessors, Field Programmable Gate Arrays (FPGAs), Application Specific Integrated Circuit (ASICs), or other suitable devices. Various input/output devices, such as keyboard and mouse (not shown), can be included to allow a user to interact with components internal and external to programming station 110.

Figure 2:
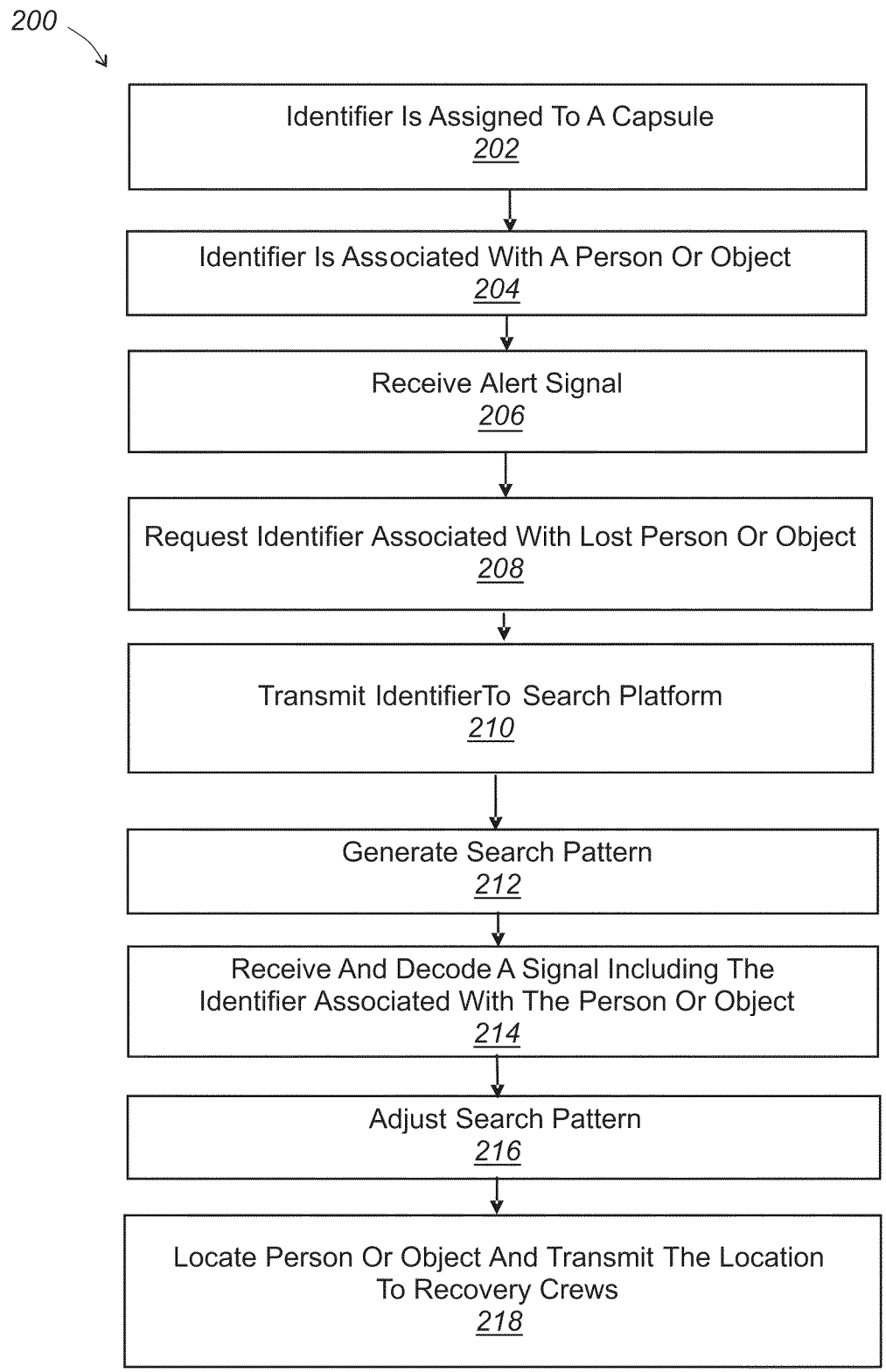
FIG. 2 is a flow diagram of an embodiment of a method for providing and detecting information regarding a person, location, or object.

FIG. 2 is a flow diagram of an embodiment of a method 200 for providing and detecting information regarding a person or object utilizing system 100. Prior to a mission, process 202 assigns an address to a capsule, which capsule is in turn assigned to a person or object in process 204. If the person or object is report missing, process 206 includes receiving an alert signal. When an alert signal is received, process 208 requests the address associated with the capsule, and process 210 transmits the address to search platform 102. Process 212 includes generating a search pattern to be executed by the search platform to locate the missing object or person. Process 214 includes receiving and decoding a series of signals including the address associated with the capsule. Process 216 can include modifying the search pattern according to the direction or angles from which the signals are received, as required. After sufficient signals are received, the location of the person or object is determined and transmitted to a control center in process 218.

Figure 3:
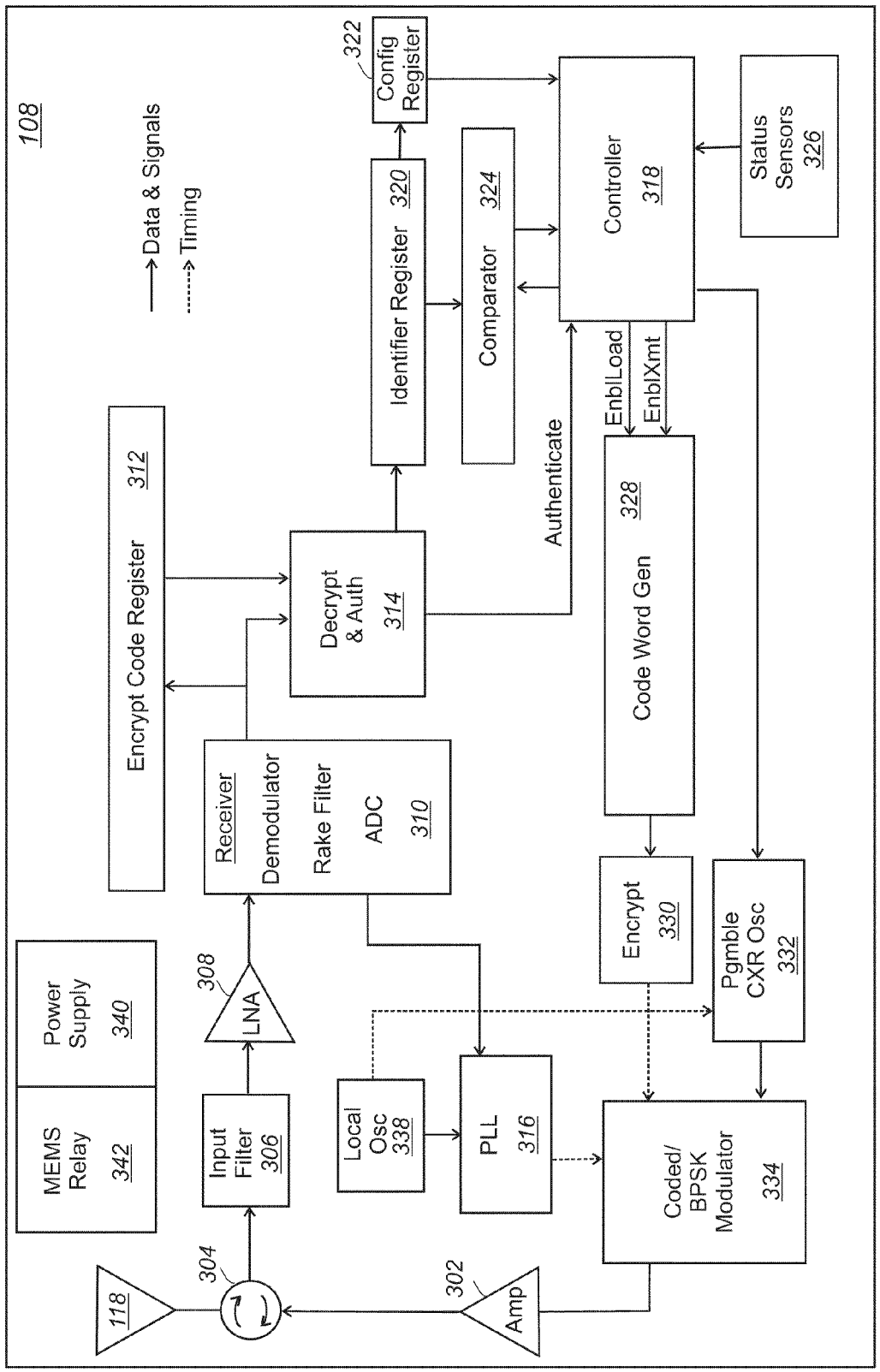
FIG. 3 is a block diagram of an embodiment of components that can be included in a capsule for providing information regarding a person, location, or object.

FIG. 3 depicts a block diagram of an embodiment of capsule 108 that is suitable for use in system 100 (FIG. 1). The term "capsule" as used herein may also refer to devices having form factors other than a pill-shape, such as a card, badge, or skin patch. Components used in capsule 108 may thus be configured to fit in a pill-sized object, an identification card, a skin patch, or other apparatus. A card may be similar to an identification card assigned to individuals, or may be affixed to an article of clothing, pen, computer, pager or personal digital assistant ("PDA") or other items routinely worn or carried by an individual. Capsule 108 can also be small enough to fit in or on disguise packaging such as toothpaste tubes, fake lug nuts, jewelry, screws and other fasteners, rocks, simulated tree bark and plants, animals, insects, birds, building materials, equipment, ordinance, and shipping crates/boxes, among others. Capsule 108 may be encased in anti-tamper packaging, coatings, or other suitable technique/structure to help prevent reverse engineering and physical dissection. Additionally, encrypted logic may be used for signals between core components of capsule 108 to protect against reverse engineering and physical probing of active components.

In capsule 108, duplexer 304 receives input signals via antenna 118 and transmits output signals from amplifier 302 via antenna 118. Duplexer 304 provides the input signals to input filter 306, which in turn provides the filtered signal to low noise amplifier ("LNA") 308, which outputs an amplified signal. The amplified signal is input to receiver 310. In the example shown, receiver 310 includes a demodulator, a rake filter, and an analog to digital converter ("ADC"). Other suitable components may be included in receiver 310 in addition to, or instead of, the components shown. Receiver 310 provides a digital signal to decrypt and authenticate module 314, phased locked loop ("PLL") 316, and encrypt code register 312. Decrypt and authenticate module 314 receives a decryption code signal from encrypt code register 312 and sends an authentication signal to controller 318 and to address register 320. Address register 320 sends a signal to comparator 324. Address register 318 also sends signals to configuration register 322. Controller 318 sends signals to comparator 324 and can receive signals from status sensors 326 that provide information regarding the person or object associated with the capsule. Controller 318 also receives signals from configuration register 322 and comparator 324. The information from configuration register 322 can include an operating mode, a return data rate, and a return carrier frequency selection. The information from comparator 324 can indicate whether the information from the capsule has been authenticated, thus allowing the controller 318 to determine whether to issue signals to code work generator 328 to load and transmit an output message to the search platform 102 (FIG. 1).

One or more status sensors 326 may be included in capsule 108 to provide information regarding the status of the person or object associated with the capsule 108. In some embodiments, status sensors 326 may provide information regarding the missing person's heart rate, body temperature, blood pressure, and/or other vital statistics. Other suitable information may be provided by status sensors 326. For example, status sensors 326 can include a microphone to record voice or other sound data that is then transmitted to search platform 102. Controller 318 may be coupled to a memory device that stores the recorded data until the data is transmitted.

Controller 318 may discern additional information using the history of the data provided by status sensors 326. For example, if capsule 108 is removed from one person and implanted or swallowed by another person, controller 318 may detect the temporary drop in body temperature and/or absence of heart beat. Controller 318 may provide such information to search platform 102, indicating that the capsule 108 may have been removed from one person and implanted in another, especially if the data resumes more typical readings for a living person. Knowledge of when a capsule 108 has been transferred to another person or object can facilitate recovery efforts by allowing appropriate resources to be deployed or different recovery tactics to be used.

Controller 318 sends load enable and transmit enable signals to code word generator 328. The load enable and transmit enable signals may be set based on the wake-up threshold at pre-low-noise amplifier (LNA) received in the message from the search platform 102. Note that the transmitter Controller 318 also sends a signal to programmable oscillator 332. Code word generator 328 sends a signal to encryptor 330, which sends a timing signal to binary phase shift keying ("BPSK") modulator 334. Local oscillator 338 sends a timing signal to programmable oscillator 332. PLL 316 receives signals from local oscillator 338 and sends timing signals to BPSK modulator 334. PLL 316 generates a signal that has a fixed relation to the phase of a "reference" signal and may generate stable frequencies, recover a signal from a noisy communication channel, and/or distribute clock timing pulses. Oscillator 332 sends signals to Coded/BPSK modulator 334. Coded/BPSK modulator 334 can include a turbo coder before the BPSK modulation. Coded/BPSK modulator 334 sends signals to amplifier 302. The timing signals allow coherency to be established for the data signals communicated between capsule 108 and search platform 102.

Decrypt and authenticate module 314 and encryptor 330 can use any suitable decryption/encryption technology such as private key/public key nonce (used once) and Design Encryption Standard (DES), among others. The size of the code can be based on the expected active life of power supply 340, i.e., typically, the shorter the overall operating time, the shorter the encrypt/decrypt code required.

Components in capsule 108 can be capable of changing receive and transmit frequencies based on a command from the search platform, thereby helping prevent jamming of subsequent transmissions. Additionally, capsule 108 can generate undersampled downlink carrier signals at data rates that eliminate the requirement for a radio frequency (RF) emitting intermediate frequency stage. Eliminating the intermediate frequency state can help prevent transmissions from capsule 108 from being detected.

In some embodiments, power supply 340 is activated when MEMS relay switch and/or logic switch 342 receives a signal from programming station 110 (FIG. 1). Power supply 340 provides operating power to components in capsule 108 and may be implemented with a battery or other self-contained power source. Note that some implementations of capsule 108 can be ingested, in which case power supply 340 can be configured to operate over an average time period required to pass through an individual's digestive tract. An ingested or implanted capsule 108 may further be configured to communicate with search platform 102 (FIG. 1) even when the associated person or object is underground and/or enclosed in a concrete building. In such situations, power supply 340 can support 20 milliWatt transmission capable of reaching an aerial search platform 102 with a 2.3 meter diameter phased array antenna aperture up to 10,000 feet away despite attenuation from a body, concrete, or other potential substances surrounding the capsule 108.

Figure 4:
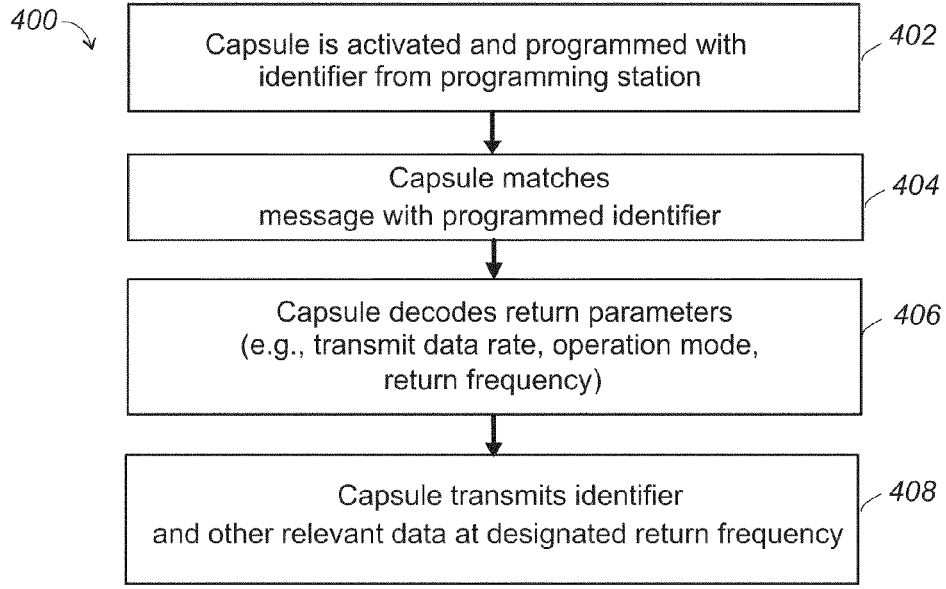
FIG. 4 is a flow diagram of an embodiment of a method for providing information regarding a person, location, or object using the capsule of FIG. 3.

FIG. 4 depicts a flowchart of an embodiment of method 400 for locating a person or object utilizing system 100. In process 402, the capsule is activated and programmed with a unique address from programming station 110 (FIG. 1). Once deployed with a person or object, the capsule may receive one or more messages from the search platform in process 404. The capsule matches the address in the message with the address in register 320 (FIG. 3) in process 404. After matching the address and authenticating the message, capsule 108 decodes the message for return parameters, such as transmit data rate, operating mode, and return frequency in process 406. The capsule transmits a message that includes the address along with other relevant data such as a decoding key, status of the person or object, an indicator of whether the capsule has been removed from the person or object to which it was assigned in process 408.

Figure 5:
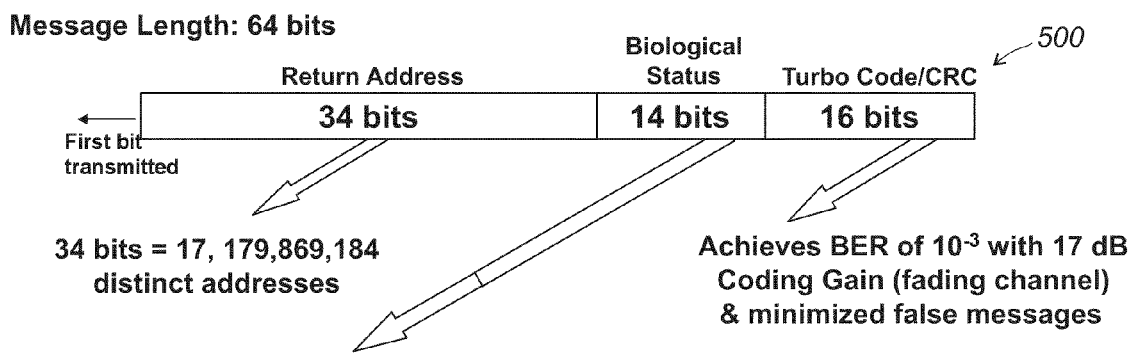
FIG. 5 depicts an embodiment of a data structure for messages transmitted by the capsule of FIG. 3.

FIG. 5 depicts a data structure of an embodiment of an uplink message 500 transmitted by capsule 108 to search platform 102. The configuration shown protects against false signals and provides unique addresses for up to seventeen billion individuals (or objects). Even when addresses are assigned to seventeen billion individuals, other relevant information such as status of the object or person can also be transmitted. The message can include 64 bits with the first thirty four bits including a unique return address, which is typically the same address associated with capsule 108, however other suitable identifiers can be used. A variation of the address may be used to detect error, or manipulation with the system integrity. Each capsule 108 is typically independently addressable to reduce the number of transmissions required for identification to one. Further, capsules 108 typically use a unique transmit address to help prevent recording and retransmission past messages or mistaken identification of other capsules 108.

In the example shown, fourteen bits of message 500 corresponding to the biological status of the person or object to whom capsule 108 is assigned. In this example, the fourteen bits may reflect more than one indication of health, including 8 bits for heart beat (256 increments between 0 and 255 beats per minute), 5 bits for body temperature (32 increments between 80 degrees Fahrenheit and 110 degrees Fahrenheit), and a 1 bit flag that indicates cessation of sensed heartbeat for a predetermined period of time. Cessation of the heartbeat may indicate unauthorized transfer of the capsule. The remaining sixteen bits can include data signal error correction information such as turbo codes and cyclic redundancy check information. Other suitable message lengths and fields of data can be used in message 500 in addition to or instead of the data fields shown in FIG. 5. Further other types of data such as voice data and/or other relevant data can be included in message 500.

FIG. 6A depicts a schematic diagram of an embodiment of a helicoil dipole antenna 600 that can be included as antenna 118 in capsule 108 of FIG. 3. In some embodiments, antenna 600 can be configured to transmit and receive over a broad range of frequencies, for example from 1 GigaHertz (GHz), which is low enough to transmit and receive through human tissue when capsule 108 is swallowed, to 6 GHz, which is sufficient to provide wide bandwidth for low probability of intercept and low probability of detection operation. For example, for applications where capsule 108 is ingested or implanted, antenna 600 can operate at channel frequencies around 1 MegaHertz (MHz) across 70 MHz of bandwidth, yielding a 7% spreading at 1 GHz. In other applications (e.g. surface patch and/or pill), capsule 108 and antenna 600 can be configured operate at channel frequencies around 10 MHz across 600 MHz of bandwidth, yielding a 10% spreading at 1 gHz. In further embodiments, capsule 108 and antenna 600 can be configured to operate at channel frequencies around 2 MHz across 70 MHz of bandwidth, yielding a 1% spreading at 6 GHz.

A series of graphs 602 next to the diagram of antenna 600 in FIG. 6A indicate the transient response over a quadrant of an embodiment of antenna 600 at fifteen degree intervals. FIG. 6B depicts a diagram of an embodiment of helicoil dipole antenna elements 604, 606 of FIG. 6A and a three-dimensional graph of the gain pattern 608.

Antenna 600 includes two center-fed elements 604, 606 for transmitting or receiving radio frequency energy. The optimum frequency of dipole antenna 600 is a function of the length of the two transmitting elements 604, 606. The size of a dipole antenna may be measured by the length of the elements 604, 606, plus a center distance between elements 604, 606. The elements 604, 606 of helicoil antennas 600 are wound in a spiral and are shorter than conventional dipole antennas with straight elements. Helicoil antenna 600 thus may fit more easily in apparatuses with small form factors, such as capsule 108.

Gain pattern 608 is a circular torus shape with zero inner diameter. Thus, the emission of antenna 600 is maximal in the plane perpendicular to the elements 604, 606 and zero in the direction of elements 604, 606. Graphs 610 show that the performance over time of helicoil antenna 600 to a step impulse function at 15 degree increments over a quadrant of the antenna 600. Antenna 600 shows strongest performance at 90 degrees to the element 604, with performance gradually degrading at each 15 degree increment. The transient response of antenna 600 falls off sharply at angles less than 30 degrees.

FIG. 7 depicts a block diagram of an embodiment of a rake filter 700 that may be used in the capsule 108 of FIG. 3. Rake filter 700 can improve communication between capsule 108 and search platform 102 by reducing the effects multi-path fading and Doppler shift in the uplink signals (from capsule 108 to search platform 102) and downlink signals (from search platform 102 to capsule 108).

A three-finger rake filter 700 is shown as an example, however, a rake filter with fewer or additional fingers may be used. Each finger independently processes a single multipath component identified by the front matched-filter. The contribution of all fingers are maximal ratio combined at a later stage. The multipath channels through which a radio wave transmits can be viewed as delayed echoes of the original transmitted wave, each with a different magnitude and time-of-arrival at the receiver 310 (FIG. 3). Each multi-path component contains the original information, so the magnitude, phase shift and time-of-arrival of each component can be computed using channel estimation with channel state estimation. Rake filter 700 provides phase rotator to correct the phase and delay equalizer to compensate delay from the difference in the arrival times of the symbols in each finger. All the components can then be added by a weighted factor to improve the accuracy of the information.

In the embodiment shown, Fingers 1, 2, and 3 can include a correlator 702, a phase rotator 704, a delay equalizer 706, and channel estimators 708. Correlator 702 receives input signals from a demodulator in receiver 310 (FIG. 3) and outputs signals to phase rotator 704 and delay equalizer 706. The output of channel estimators 708 is provided to phase rotator 704. The output of phase rotator 704 is cascaded with delay equalizer 706. The output of delay equalizer 706 is provided to combiner 710, which combines the weighted output of delay equalizers 706 from Fingers 1, 2, and 3. The input signals from the demodulator are also provided to matched filter 712, which identifies parallel to Fingers 1, 2, and 3 allocations. The output of matched filter 712 can also be provided to Fingers 1, 2, and 3.

A series of x-y graphs next to the diagram of rake filter 700 show the transmitted symbol, the symbol received by Fingers 1, 2, and 3, the symbol after being modified with the channel estimators 708, and the combined symbol output by combiner 710. The graph of the combined symbol matches very closely to the graph of the transmitted symbol, thus showing the ability of rake filter 700 to reduce the effects of multi-path fading in the signals transmitted to capsule 108.

Figure 8A:
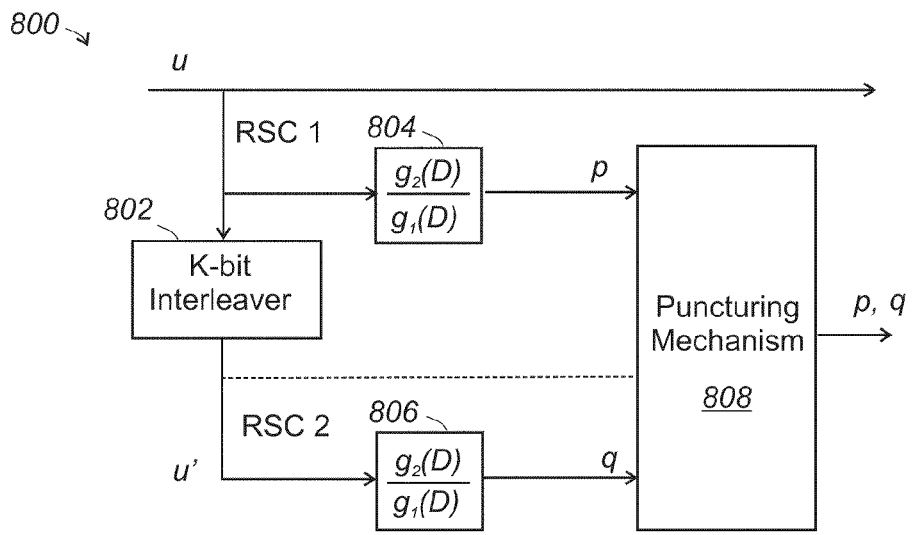
FIG. 8A depicts block diagram of an embodiment of a turbo encoder that may be used in the capsule of FIG. 3.
Figure 8B:
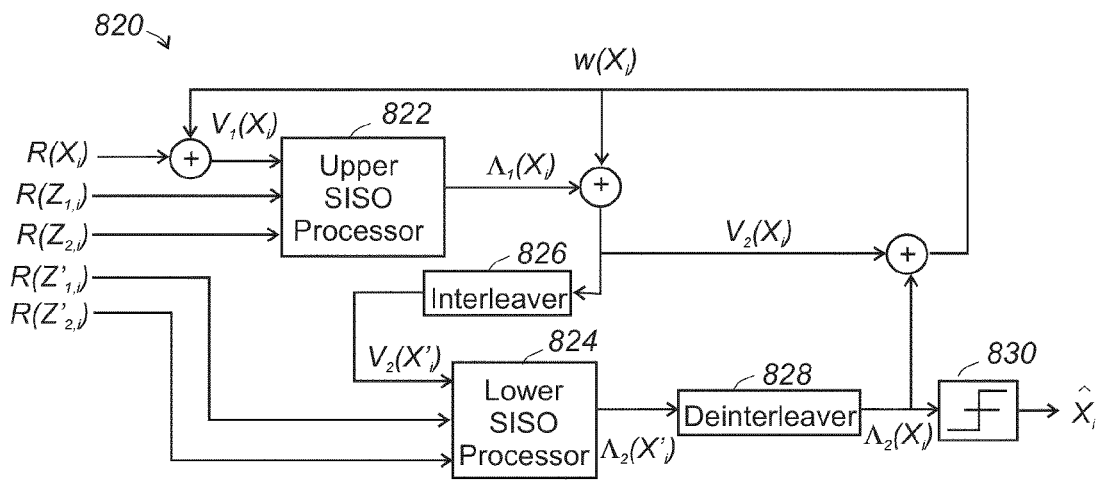
FIG. 8B depicts block diagram of an embodiment of a turbo decoder that may be used in the capsule of FIG. 3.

Referring to FIGS. 8A and 8B, capsule 108 (FIG. 3) and/or search platform 102 (FIG. 1) can include a parallel turbo coder, such as embodiments of turbo encoder 800 and turbo decoder 820 shown, to further improve receiver sensitivity and reduce detectability of signals by unintended receivers. Turbo coders 800, 820 use error correction codes to achieve power efficiency transmission over a limited-bandwidth communication link in the presence of data-corrupting noise. Turbo coders 800, 820 can be used to decrease the amount of power used to transmit data at a certain data rate. Alternately, turbo coders 800, 820 make it possible to increase data rate without increasing the power of a transmission.

Turbo encoder 800 includes interleaver 802, two recursive systematic convolutional (RSC) encoders 804, 806, and puncturing mechanism 808. Turbo encoder 800 includes a parallel concatenation of RSC encoders 804, 806 of rate ½. Source data is input to the RSC encoder 804, while interleaver 802 provides a permutation of the source data to RSC encoder 806. Interleaver 802 is assumed to be pseudorandom and has a size of K bits, which ensures that the probability that a different bit sequence is presented to each encoder is very high. The output of the turbo encoder 800 includes the source data, parity bits from RSC encoder 804, and parity bits from RSC encoder 806.

In some embodiments, the output of turbo encoder 800 increases the code rate of ⅓ to a high code rates by providing the two sets of parity bits from RSC encoders 804, 806 802 to puncturing mechanism 808. The parity bits may be deleted to increase the code rate 808. A value of 0 in a puncturing vector implies that the corresponding bit is punctured. Each puncturing vector of length N is based on a pattern of length l, which is repeated N/l times. The interleaved source data, and the parity bits of RSC encoders 804, 806 are punctured using puncturing vectors. Resulting turbo codes from puncturing mechanism 808 are transmitted along with the source data.

Referring to FIG. 8B, the embodiment of turbo decoder 820 shown includes soft-input soft-output (SISO) decoders 822, 824, interleaver 826, and deinterleaver 828. Decoder 822, 824 use a priori information to produce soft estimates of the source bits by processing the log-likelihood ratios (LLRs) of the received data and parity bits. When the punctured code words are implied, zero values are inserted at the positions where puncturing took place. Decoder 822 uses a priori information to produce soft estimates of the received bits by processing the LLRs of the received bits and the LLRs of the receive parity bits of the first RSC encoder 804. Extrinsic information is extracted from the soft estimates of the source bits and acts as a priori information for the second decoder 824. Similarly, the second decoder 824 processes the LLRs of the received interleaved bits as well as the LLRs of the received parity bits of the second RSC encoder 806 to produce better estimates of the source bits as well as extrinsic information. The estimates from the second decoder 824 are used as a priori information by the first decoder 822 at the next iteration. Decoding algorithms can be based on the Maximum A-Posteriori algorithm, also known as the BCJR algorithm, the soft output Viterbi algorithm, or other suitable algorithm.

Figure 9:
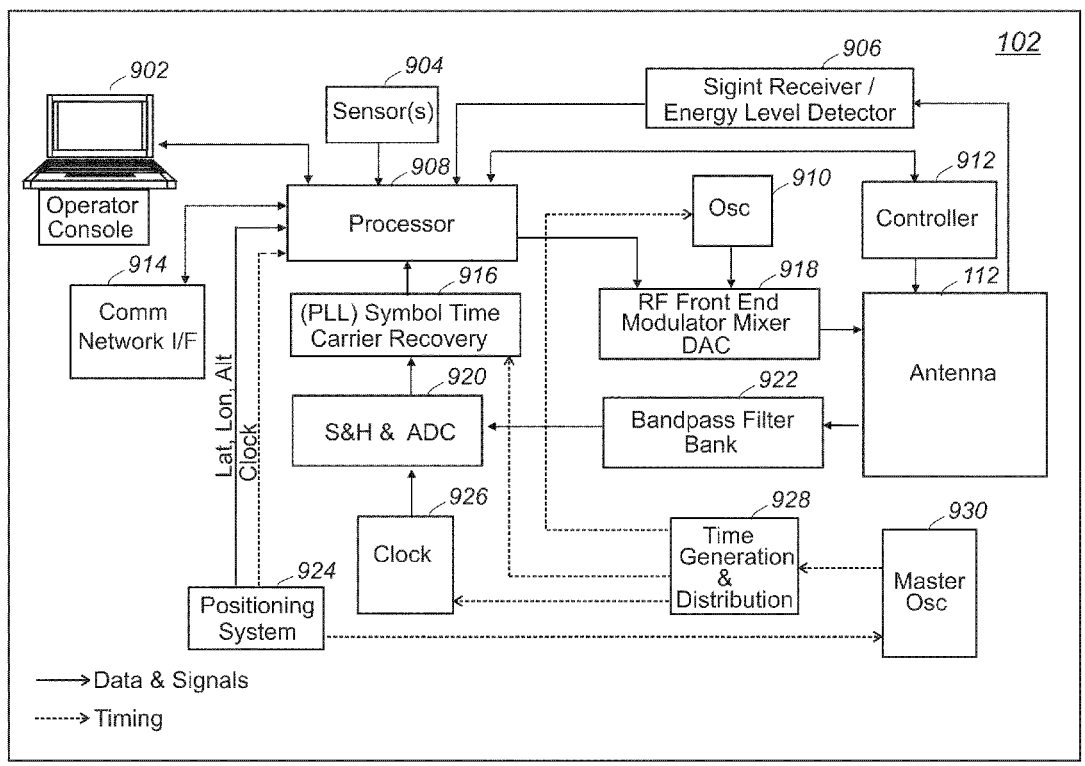
FIG. 9 is a block diagram of an embodiment of a search platform that may be used to detect information regarding a person, location, or object.

FIG. 9 depicts an embodiment of search platform 102 that includes operator console 902, sensor(s) 904, SIGnals INTelligence (Sigint) receiver/energy level detector 906, processor 908, oscillator 910, controller 912, communication network interface 914, phase locked loop (PLL) 916, radio frequency (RF) front end 918, antenna 112, sample and hold and analog to digital converter (ADC) 920, bandpass filter bank 922, positioning system interface 924, clock 926, time generation and distribution module 928, and master oscillator 930.

Processor 908 sends and receives data from at least the following components: operator console 902, communications network interface 914, and controller 912. Processor 908 receives data from at least the following components: sensor(s) 904, receiver/energy level detector 906, positioning system interface 924, and PLL 916. PLL 916 receives data from sample and hold/analog to digital converter (S&H & ADC) module 920, which receives data from bandpass filter bank 922. Processor 908 transmits data to RF front end 918. RF front end 918 also receives signals from oscillator 910, which receives signals from time generation and distribution module 928. Antenna 112 receives signals from controller 912. Time generation and distribution module 910 receives signals from master oscillator 930. Master oscillator 930 receives signals from GPS interface 924.

In some embodiments, search platform(s) 102 can be included in one or more airborne platforms, such as aircraft, helicopters, lighter-than air vehicles, spacecraft, and/or satellites. Antenna 112 can include a phased array radar antenna with an embedded low noise amplifier and power amplifier coupled to receiver 906 and RF front end 918 to communicate with capsule 108 (FIG. 1). In applications where capsule 108 is swallowed or the person or object to which a capsule 108 is assigned is located in a building or underground, antenna 112 and capsule 108 can operated at frequencies around 1 (one) GigaHertz (GHz) to overcome attenuation effects of the human body, concrete reinforcing bars, and other substances that may attenuate the signals communicated between capsule 108 and search platform 102.

Positioning system interface 924 can be configured to communicate with a positioning system (not shown), such as a global positioning system (GPS), other type of satellite positioning system, or other source of data capable of indicating the location of search platform 102 in two or three-dimensional space. For example, search platform 102 may receive information from an inertial measurement unit ("IMU"). An IMU works by detecting the current rate of acceleration and changes in rotational attributes, including pitch, roll and yaw. This data is then fed into a guidance computer, such as processor 908, which uses the data to calculate the current position. The IMU detects accelerations which are integrated by a guidance computer to deduce the position and velocity of the vehicle. Including an inertial measurement unit can increase the accuracy of the calculation of the location of the capsule 108.

Receiver/energy level detector 906 can be a bin receiver that subdivides a wide bandwidth signal into smaller bands or bins. The bins contain regions of signal energy and the receiver 906 measures the power in the various bins to locate regions of interest that have significant detectable power levels. In some embodiments, the wideband detection bandwidth is converted into a frequency domain snapshot using Fast Fourier Transform (FFT) in processor 908. To focus on a particular narrow band signal of interest, a certain number of adjacent channels can be recombined into a narrowband time domain stream of data that can be further processed.

Filter bank 922 can sort signals from antenna 112 into segments of predetermined frequency. An input signal with a certain frequency will fall into a certain filter, and by measuring the output of the filters, the input signal frequency is estimated.

In an embodiment, components in search platform 102 can have the following specifications:
  Receiver 906 includes 16 bins;
  Oscillator 910 produces repetitive electronic signals at 1.1 GHz;
  RF front end 918 includes a modulator, mixer, and an 8-bit, 27.5 MHz digital to analog converter;
  Bandpass filter bank 922 has 8 poles and selectable frequencies of 100 KHz, 1 MHz, and 10 MHz;
  Communication network interface 914 communicates with a satellite network;

Time generation and distribution module generates signals at 0.1, 1, and 10 MHz;

Positioning system interface 924 communicates with a global positioning system to provide latitude, longitude, and a 1 second clock signal to processor 908, and a 1 second clock signal to master oscillator 930;

Master oscillator 930 generates signals at 10 MHz; and

Clock 926 can produce signals up to 1250 MHz.

The clocks in capsule 108 and search platform 102 may be synchronized to achieve data coherency between search platform 102 and capsule 108. Clock coherency can be used to increase the accuracy of determining the capsule location. In a first alternative, a clock on board the search platform 102 is designated as the master clock. A clock in capsule 108 is designated a slave to the master clock. Search platform 102 also downloads a clock strobe for upload of the return data or signal. The master/slave configuration allows the capsule to upload sixty-four (64) bits of data at one (1) megahertz. In another configuration, capsule 108 includes a fast PLL 316 that is constantly adjusted using the signal from local oscillator 338 to match in phase (and thus lock on) the frequency of a signal received from search platform 102. PLL 316 can provide timing input to modulator 334 before a return message is transmitted to search platform 102.

Figure 10:
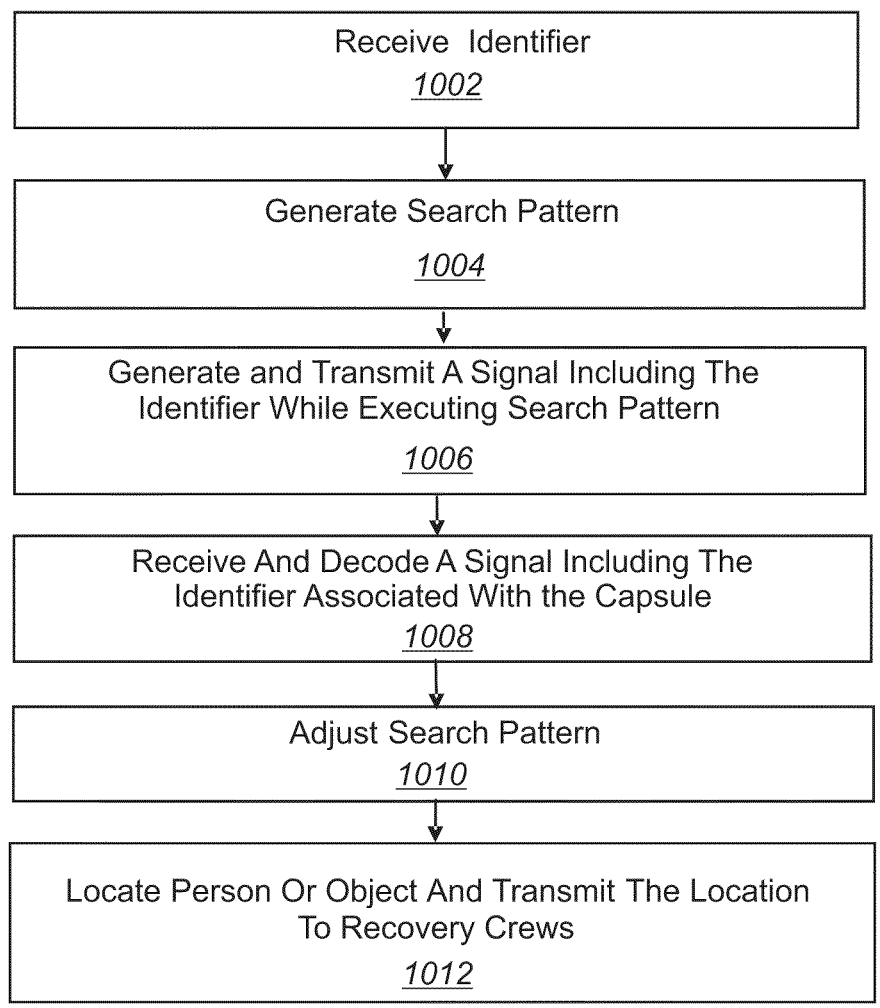
FIG. 10 is a flow diagram of an embodiment of a method for detecting information regarding a person, location, or object.

FIG. 10 is a flowchart of an embodiment of method 1000 performed by an airborne search platform 102 (FIG. 9). Process 1002 includes receiving an identifier such as an address associated with a capsule, the capsule being associated with a person, object or location. Process 1004 can include generating a search pattern to be executed by the search platform to determine the location of the capsule. In some embodiments, the location of the capsule may be fixed and known, in which case search platform 102 may execute a flight pattern over one or more capsules to receive relevant information from the capsule(s). Process 1006 can include generating and transmitting a message that includes the identifier while executing the search pattern. Some or all of the capsules in the area of the search platform may receive the signal and decode the identifier. When the identifier matches a particular capsule's own identifier, the capsule may respond with a message that supplies information relevant to the purpose of the capsule. For example, the message may include health status of a person or object to whom the capsule is assigned, and/or other information regarding the person/object and/or the environment surrounding the location of the capsule. The information may include alphanumeric data, voice data, video data, as well as any other suitable data in any suitable format that may be provided by the capsule. Process 1008 can include receiving and decoding the message signals from the capsule(s). The messages include the identifier of the capsule so the data in the message may be correlated with the person/object and/or location of the capsule.

Process 1010 can include adjusting the search pattern according to the direction or angles from which the signals are received, as required. In some embodiments, after sufficient signals are received, the location of the person or object can be determined and provided to recovery crews, and/or information regarding the location of the capsule may be provided in process 1012.

Figure 11:
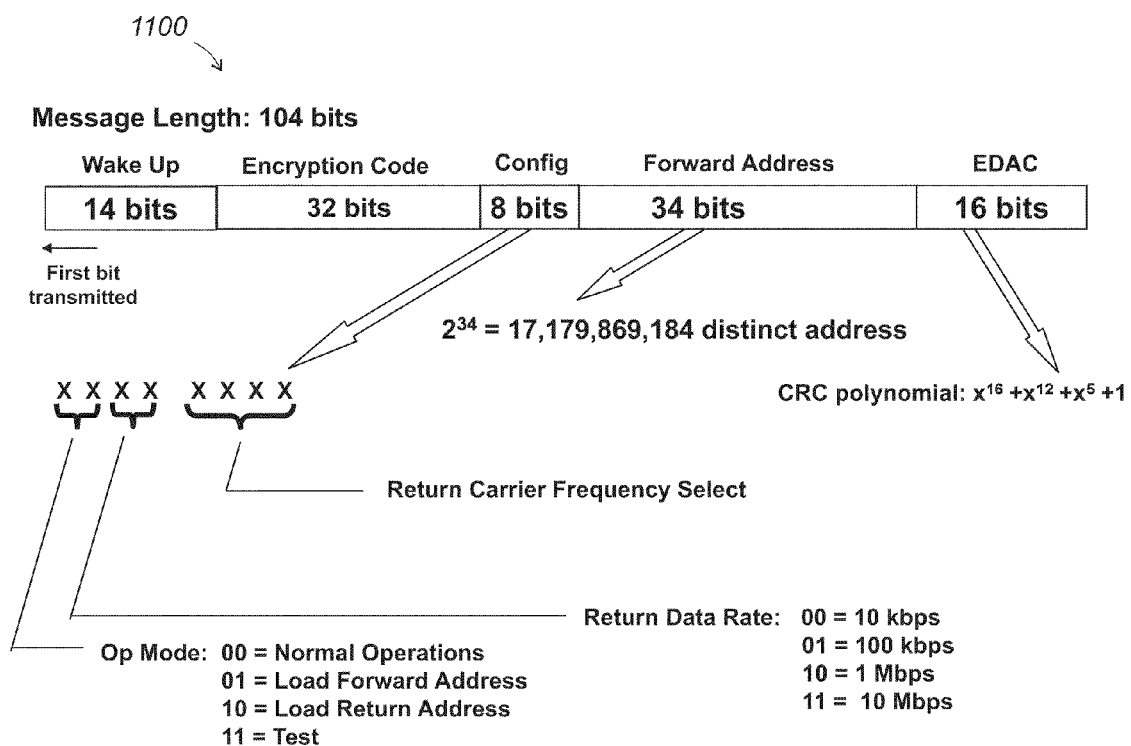
FIG. 11 depicts an embodiment of a data structure for messages transmitted by the search platform of FIG. 9.

FIG. 11 shows an embodiment of a data structure for messages 1100 transmitted by a search platform 102 to a capsule 108. In the example shown, the signal includes one-hundred and four (104) bits of information, although other embodiments of message 1100 can include more or fewer bits. Fourteen (14) bits can be allocated to a wake up signal. The transmitter of the capsule may remain in a deactivated state to reduce probability of detection until these specific fourteen bits (14) are received in this location in the signal. The wake up bits can be used to allow the transmitter to become active when the capsule is ready to transmit a message.

Message 1100 can further include an encryption code of thirty-two (32) bits. The encryption code may act as a key, enabling the capsule to decode the remaining information in message 1100 using public key/private key, DES, and/or other suitable security coding techniques.

Message 1100 can further include an 8-bit configuration code, with two bits used to indicate operation mode, two bits to indicate return data rate, and four bits to indicate a carrier frequency to be used to transmit return messages. For example, two bits representing the operation mode may be set as follows: normal operation (00), load forward address (01), load return address (10), or test (11).

The return data rate can indicate the amount of data transferred in a given time via the return message(s). In the example shown, four different data rates may be specified including 10 kilo bytes per second (kbps) (00), 100 Kbps (01), 1 Mega bytes per second (Mbps) (10), and 10 Mbps (11). Other data rates may be specified in addition to or instead of the preceding examples.

The return carrier frequency can specify the frequency at which return messages from capsule 108 are transmitted. In the example shown, 4 bits can be used to specify 16 different frequencies. The frequency selected can be based on the availability of frequencies that do not interfere with AM broadcasts, FM broadcast, television broadcast, aeronautical navigational aids, mobile phones, etc. One spectrum with the least interference is between 950 and 1100 MHz, but transmissions from capsule 108 can be frequency agile to avoid interference. For example, the return frequency can be specified as any distinct frequency between 950 and 1100 MHz in 10 MHz increments. Other suitable frequencies and increments between frequencies can be specified. Note also that a fixed return frequency can be used.

The forward address can be specified using 34 bits to provide $2^{34}$ or 17,179,869,184 distinct addresses. Thus, search platform 102 can distinguish between and communicate with over 17 billion capsules. Any other suitable number of bits can be used.

Message 1100 can further include a field for Error Detection and Correction codes (EDAC), and other data accuracy/error correction information. The example shown includes sixteen (16) bits that can be used to specify a cyclic redundancy check (CRC) polynomial (e.g., $x^{16}+x^{12}+x^5+1$). Other suitable error correction/check technique can be used.

Figure 12:
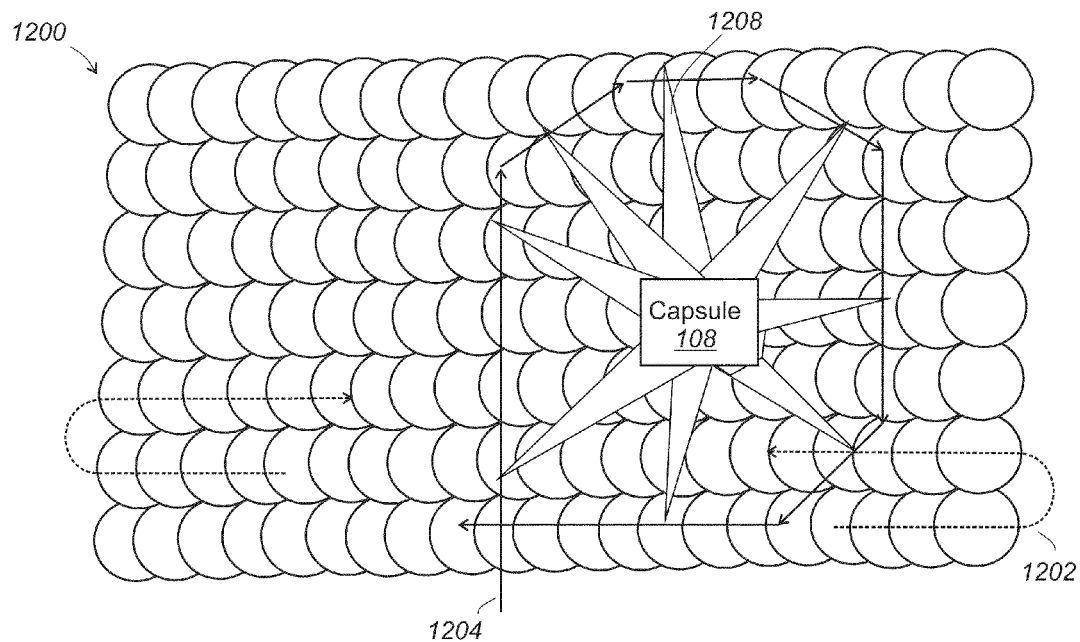
FIG. 12 depicts an embodiment of an antenna scan pattern and a platform search pattern for an airborne search platform to detect and determine the location of a person or object.
Figure 13:
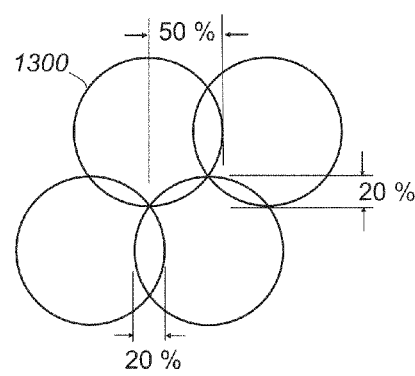
FIG. 13 depicts an embodiment of an antenna scan pattern with overlapping beams to avoid gaps in the region being scanned.
Figure 14:
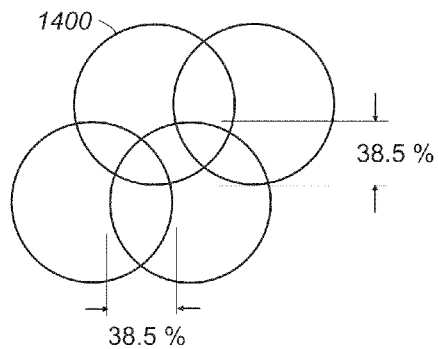
FIG. 14 depicts an embodiment of an antenna scan pattern with increased beam overlap to avoid gaps in the region being scanned and improve antenna accuracy.

Referring now to FIG. 12, an embodiment of an antenna scan pattern 1202 and an aircraft search pattern 1204 to determine the location of a person or object using an airborne search platform 102 (FIGS. 1, 9) is shown. A planar-array antenna 112 (FIG. 9) can sweep a series of beams through a suitable scan pattern, such as left to right, back to forward, with overlapping beams. As shown in FIG. 13, circular beam patterns 1300 can overlap by approximately 20% with beam patterns 1300 staggered horizontally by 50% to achieve full coverage of the area being scanned. FIG. 14 shows circular beams 1400 overlapping 38% to compensate for uncertainties and errors in the antenna performance and signals received from capsule 108. Other overlap percentages can be used depending on accuracy required and component performance.

As antenna 112 sweeps the scan pattern, antenna 112 periodically transmits messages, such as message 1100 (FIG. 11). The vehicle carrying the search platform 102 executes a search pattern 1204 through the area or region being scanned. If a capsule 108 with a matching address receives a message from platform 102, capsule 108 can transmit a return message, such as message 500 (FIG. 5), to search platform 102. The process of sending messages from the search platform 102 can be referred to as "pinging" the capsule 108.

Upon receipt of a return message from capsule 108, the aircraft carrying search platform 102 can alter search pattern 1204 toward the direction from which the return message was detected, as determined by antenna 112 and processor 908. For example, if search platform 102 detects a return message from starboard side, the aircraft can alter its search pattern 1204 by turning toward the direction from which the return message was detected. If the message is received from the right-hand side, the aircraft turns to the right; if the signal was received from the left-hand side the aircraft can turn to the left. Any suitably shaped search pattern can be used, such as a series of eight straight paths connected by 45 degree turns to create an octagon around the capsule 108. The shape and size of the search pattern can vary as required.

Figure 15:
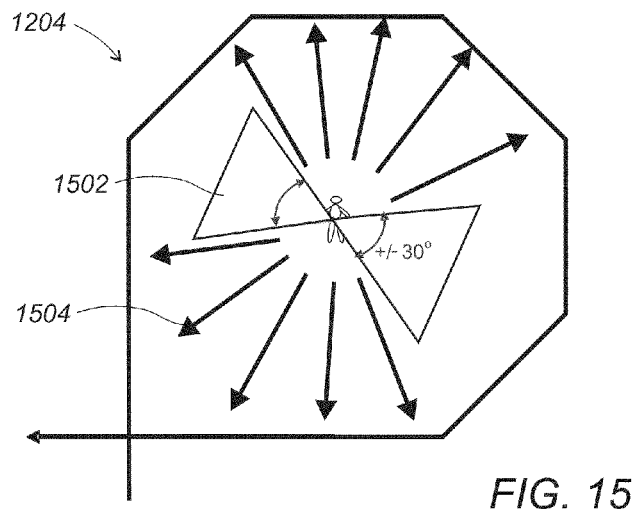
FIG. 15 depicts an embodiment of a series of return messages from the capsule in response to pings from the search platform with areas of dipole antenna blockage.

Referring to FIG. 15, the dipole antenna 118 (FIGS. 1, 3) in capsule 108 can have a region of blocked transmission 1502, such as described and shown for angles less than 30 degrees in FIGS. 6A and 6B. As the aircraft is executing the search pattern 1204, the search platform 102 will not receive messages (represented by arrows 1504 radiating from capsule 108) when search platform 102 is positioned plus or minus 30 degrees with respect to the elements of antenna 118. Search platform 102 can ping capsule 108 repeatedly as the search pattern 1204 is executed. For example, search platform 102 can ping capsule 108 until it receives approximately a sufficient number of return messages are successfully received around some or all of search pattern 1204. In some embodiments, search platform 102 uses Time Difference of Arrival (TDOA) techniques to determine the location of capsule 108.

Figure 16:
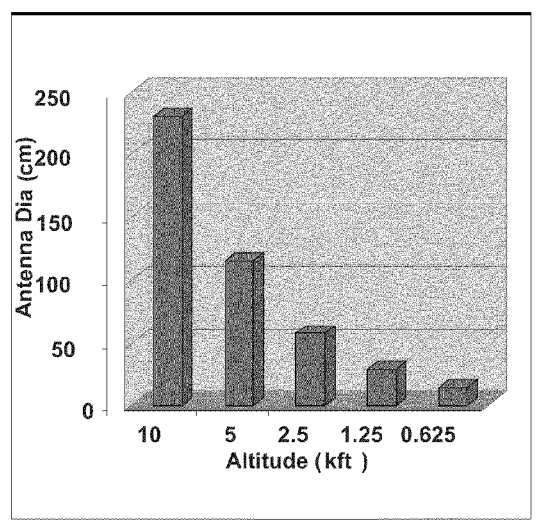
FIG. 16 depicts a graph of an embodiment of a search platform antenna diameter versus altitude.
Figure 17:
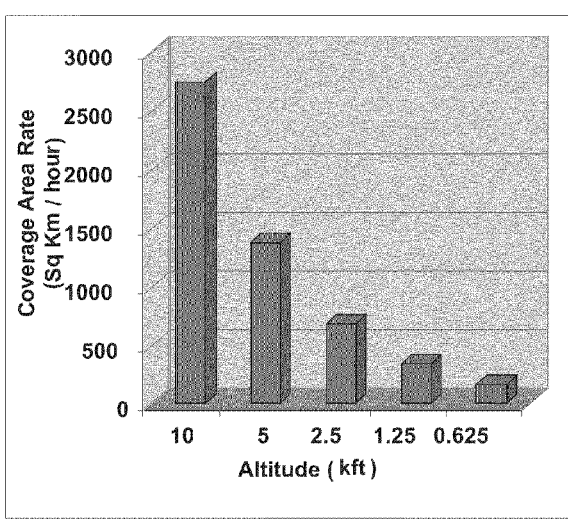
FIG. 17 depicts a graph of an embodiment of search platform antenna coverage rate versus altitude.

FIG. 16 shows a graph of antenna aperture diameter versus altitude and FIG. 17 shows a graph of coverage area rate versus altitude. In FIG. 16, antenna diameter varies approximately exponentially from 225 centimeters at an altitude of 10000 feet to an antenna diameter of approximately 10 centimeters at 500 feet altitude. In FIG. 17, data for an aircraft traveling at 280 miles per hour is shown with coverage area rate varying exponentially from 2750 square kilometers per hour at an altitude of 10000 feet to 15 square kilometers per hour at 625 feet altitude. Coverage area rate is generally linearly proportional to speed of the aircraft.

Table 1 below show parameters for components in an embodiment of capsule 108 and search platform 102, and resulting performance capabilities for a surface capsule 108, which is a capsule that has not been ingested, placed behind concrete, and is not underground.

TABLE 1

Performance for Surface Capsules

| Parameters | Value | Metric |
|---|---|---|
| Building (40 cm Concrete Block) | 23/23 | dB |
| Carrier Freq (Downlink/Uplink) | 1.1/.95~1.05 | GHz |
| Capsule Transmit Power | 10,000/20 | mW |
| Capsule Antenna Gain | −10 | dBi |
| Weather & Atmospheric Loss | 1 | dB |
| Aircraft Altitude/Max Range to Capsule | 3.048/5.3 | Km |
| Spreading Loss (DL)/Free Space Loss (UL) | 85.5/106.9 | dB |
| Aircraft Phased Array Dia/Eff Dia @ 45° off axis | 2.3/2.0 | meter |
| Aircraft DL Minor Axis Beam footprint @ max range | 741 | meter |
| Downlink (DL)/Uplink (UL) Data Rate | 10/1.0 | Mbps |
| Uplink Signal-to-Noise Ration (SNR) | 11.1 | dB |
| First Look Rotation & Translation Error of Beam Lay down | 25.1 | meter |
| Capsule Circular Error Probability (CEP) after Required pings and 270 degree Rotation about Capsule | 4.55 | meter |
| Final Target CEP with Aircraft Position Error included | 6.55 | Meter |
| Number of Required Pings to Achieve Above CEP | 4 | Qty |

Table 2 below show parameters for components in an embodiment of capsule 108 and search platform 102, and resulting performance capabilities for ingested capsule 108, which refers to a capsule that is ingested, behind concrete, or underground.

TABLE 2

Performance for Ingested Capsules

| Parameters | Value | Value | Metric |
|---|---|---|---|
| Mission | Initial Search | Pinpoint | NA |
| Building (40 cm Concrete Block) & Body Attenuation (Downlink/Uplink) (DL/UL) | 45.4/43 | 45.4/43 | dB |
| Carrier Freq (DL/UL) | 1.1/.95~1.05 | 1.1/.95~1.05 | GHz |
| Aircraft/Capsule Transmit Power | 10,000/20 | 10,000/20 | mW |
| Capsule Antenna Gain | −10 | −10 | dBi |
| Weather & Atmospheric Loss | 1 | 1 | dB |
| Aircraft Altitude/Max Range to Capsule | 3.048/5.3 | 0.953/1.65 | Km |
| Spreading Loss (DL)/Free Space Loss (UL) | 85.5/106.9 | 75.3/96.8 | dB |
| Aircraft Phased Array Dia/Eff Dia @ 45° off axis | 2.3/2.0 | 2.3/2.0 | meter |
| Aircraft Downlink Minor Axis Beam footprint @ max range | 741 | 231 | meter |

TABLE 2-continued

Performance for Ingested Capsules

| Parameters | Value | Value | Metric |
|---|---|---|---|
| Downlink/Uplink Data Rate | 10/0.01 | 10/0.1 | Mbps |
| Uplink SNR | 7.1 | 7.1 | dB |
| First Look Rotation & Translation Error of Beam Laydown | 25.1 | 7.78 | meter |
| Capsule Circular Error Probability (CEP) after required pings and 270° Rotation about Capsule | 40.7 | 4.55 | meter |
| Final Capsule CEP with Aircraft Position Error included | 42.7 | 6.55 | Meter |
| Number of Pings to Achieve Above CEP | 500 | 400 | Qty |

The data in Table 2 assumes a forward angled sweep pattern for TDOA determination while sweeping maximum ground footprint (from 45 degrees left to 45 degrees right, 45 degrees back to 45 degrees forward). The following example determines the number of capsules 108 that can be searched for a given configuration of search platform 102 and capsule 108. Assume the antenna Sweep Period is Beamwidth (radians)×(Altitude/Cos $\alpha$)/(AC forward velocity), where $\alpha$ is the angle between the vertical axis of the aircraft and the antenna beam. Sweep Distance is 2×Altitude. Sweep Rate is Sweep Distance/Sweep Period. Further assume aircraft speed is 280 mph (125.2 meters/second). Altitude is 10000 feet (3.048 Km); $\beta$ is 45°, where $\beta$ is the angle between rightmost and/or leftmost to the nadir; Line (row) Sweep Dist is 6.1 km. Required Sweep Period is 3.67 seconds. Number of sweeps between +/−45° window is 13 (with 38.5% overlap). Pulse Repetition Frequency is 35 microseconds for speed of light. Assume 10 microseconds capsule turn around delay and 10 microseconds search platform processing delay. Data transfer delay for ping message size of 104 bits/10 Mbps is 10.4 microseconds. Data transfer delay for return message is 64 bits/100 kbps=640 microseconds. One pulse cycle=35+10+10+10+640=705 microseconds. Time to sweep beam across 13 rows×705 microseconds=9,165 microseconds. Time to sweep beam across region (13 rows×13 columns) is 9,165×13 sweeps=119,145 microseconds. Margin at 280 mph=30.8×, which is sufficient to search for 30 targets in a search region of 36 square kilometers. The Margin is typically the received signal signal-to-interference and noise ratio (SINR) minus the required SINR=7.0 dB.

In some embodiments, two airborne search platforms 102 may be used to improve the speed and accuracy of locating capsule(s) 108. For example, two aircraft in communication with a capsule 108 can exchange and synchronize their respective altitudes, attitudes and Time Difference of Arrival signals. Using two airborne search platforms 102 instead of one may provide a more accurate location of a capsule depending on the location of the capsule(s) with respect to the two search platforms 102.

Figure 18:
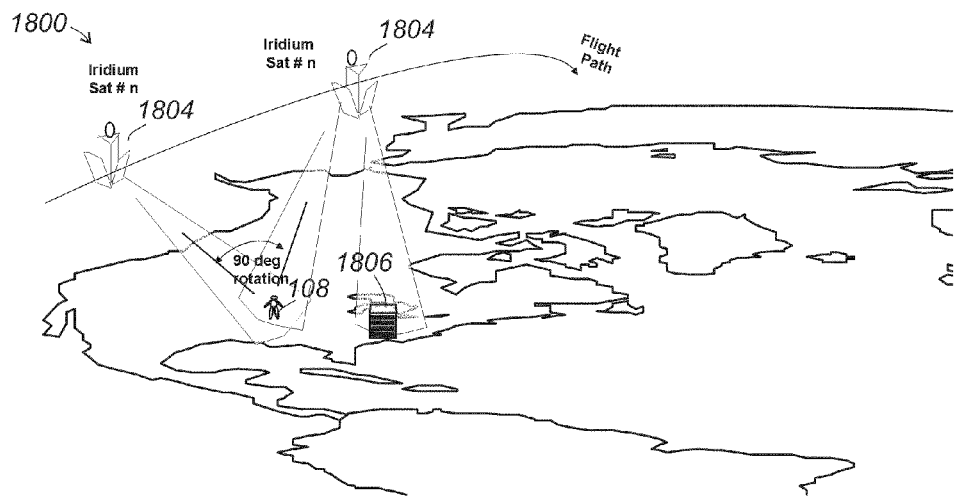
FIG. 18 shows a diagram of another embodiment of a system for locating one or more capsules.

Referring to FIG. 18, a diagram of another embodiment of a system 1800 for locating one or more capsules 108 is shown with search platforms 102 implemented in satellites 1804. For example, search platforms 102 can be implemented in the Iridium satellite constellation to locate/track people or objects carrying capsules 108. An Iridium satellite with a 2 square meter aperture can typically determine the location of capsule 108 within 4 meters of circular error probability (CEP) once the Iridium has rotated 90 degrees about the capsule 108. In some embodiments, capsules 108 may remain stationary and communicate information regarding the environment or other relevant information to search platforms 102 in satellites 1804. Satellites 1804 and/or search platforms 102 can forward the information from capsules 108 to a ground station 1806 or other suitable facility for designated uses, such as search and rescue efforts, tracking people or objects, environmental monitoring, etc. Note that satellites 1804 may already include some of the components in search platform 102 as shown in FIG. 9. Accordingly, fewer components may be required in search platform 102 if the satellite 1804 already includes functionally equivalent components. System 1800 provides capability for finding and tracking people or objects carrying capsules 108 in any area of the world covered by satellites 1804.

Figure 19:
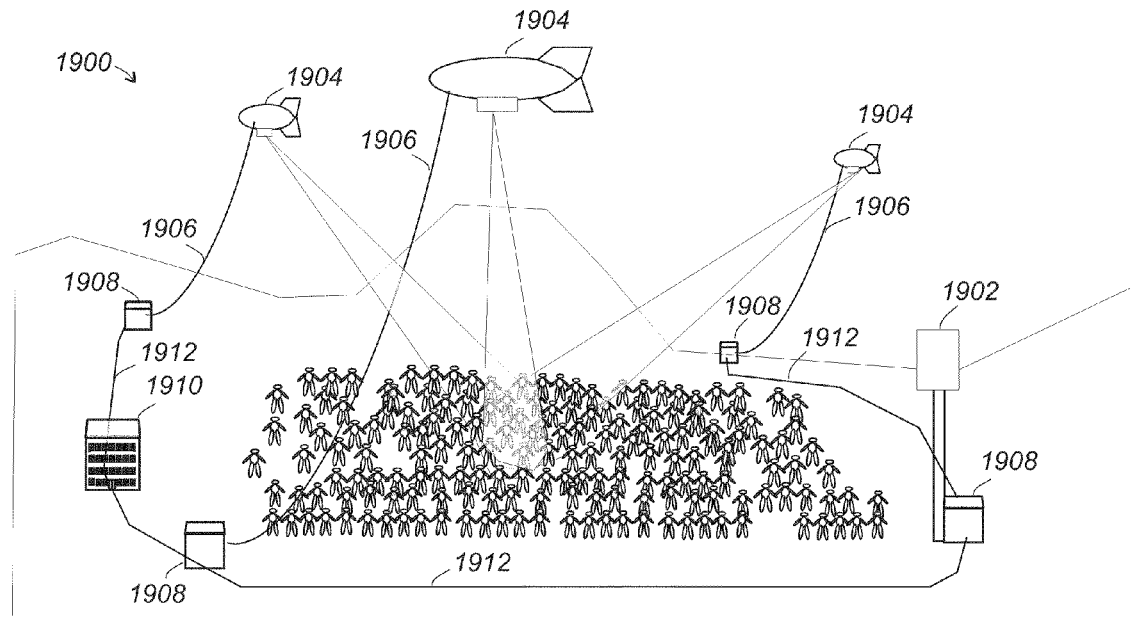
FIG. 19 shows a diagram of another embodiment of a system for locating one or more capsules.

Referring to FIG. 19, a diagram of another embodiment of a system 1900 for locating one or more capsules 108 is shown with search platforms 102 implemented in ground towers 1902 and/or aerostatic vehicles 1904. Aerostatic vehicles 1904 may be dirigibles or other suitable lighter-than-air objects. Vehicles 1904 may be connected via tethers 1906 to ground hubs 1908 or other suitable location. Ground towers 1902 can be coupled to ground hubs 1908, and ground hubs 1908 can be coupled to a control center 1910 via wired communication links 1912. Tethers 1906 can include communication lines to transfer data between vehicles 1904. Alternatively, wireless communication may be used between ground towers 1902, vehicles 1904, ground hubs 1908, and control center 1910. Ground hubs 1908 can be included in system 1900 when wired communication links 1912 are used, however in wireless implementations or if only one vehicle 1904 and/or tower 1902 are used, ground towers 1902 and vehicles 1904 may communicate directly with control center 1910. System 1900 provides capability for monitoring people or objects carrying capsules 108 in a particular region covered by vehicles 1904 and ground towers 1902. System 1900 is thus useful for determining when overcrowding or congestion occurs in crowds of people as well as vehicular traffic. System 1900 also allows the location of one or more people or objects in a crowd to be determined.

Figure 20:
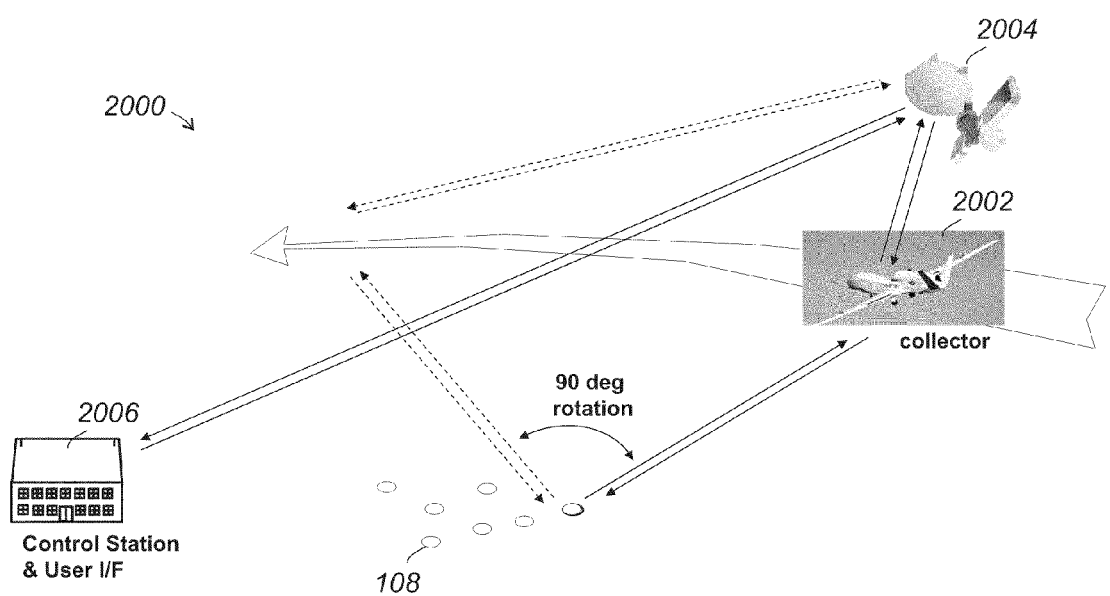
FIG. 20 shows a diagram of an embodiment of a system for collecting data from one or more stationary capsules.

Referring to FIG. 20, a diagram of an embodiment of a system 2000 for collecting data from one or more stationary capsules 108 is shown with search platforms 102 implemented in an airborne vehicle 2002, such as an airplane, helicopter, satellite, or other spacecraft. Airborne vehicle 2002 can be programmed with knowledge of the location and address of capsules 108 to thereby gather data from specific locations without requiring address information from control station 2006. Note that a ground-based tower or other platform can be used to host the search platform 102 in addition to or instead of airborne vehicle 2002.

One or more capsules 108 may also be placed in a location, either overtly or covertly, to provide alphanumeric, audio, and/or video data from the location. Airborne vehicle 2002 can send a series of ping messages 1100 as it flies over capsule(s) 108. The ping message may indicate the type of data that is requested as well as a return frequency, etc.

Capsule 108 can be configured to detect the presence and even the quantity of one or more substances at the location. For example, capsule 108 may be configured to detect and transmit the presence of water or another substance at surface or underground levels. When a group of capsules 108 are present, data can be correlated between capsules 108 to detect movement of a substance or direction of other changes in the environment. Capsules 108 can thus be used to detect the movement of ground water as well as substances in ground water, for example. Note that when capsules 108 are placed in three-dimensional space, whether above or below ground, a three-dimensional image or model may be created of the presence and movement of one or more substances.

The term "location" unless specified otherwise, refers to a the singular or plural, including a linear or curvilinear group of locations, an area or a volume, as in a ground area including the beneath-ground volume associated therewith. In an example, "location" may refer to a location-within-a-location including a location within a predetermined curvilinear path or a location within a known or predetermined area of the earth's surface. In another example, "location" as used herein may also be interpreted to mean a predetermined area of the earth's surface and a pre-determined distance below the earth's surface. Thus, "location" may also be interpreted to mean a known location or set of locations within a three-dimensional volume.

The illustrative flow charts (and block diagrams) provided herein depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the processes necessary to provide the structures and methods disclosed herein. Variations and modifications of the embodiments disclosed herein may also be made while remaining within the scope of the following claims. The functionality and combinations of functionality of the individual modules can be any appropriate functionality. Additionally, limitations set forth in publications incorporated by reference herein are not intended to limit the scope of the claims. In the claims, unless otherwise indicated the article "a" is to refer to "one or more than one".

We claim:

1. An apparatus comprising:
a self-contained power supply;
a helicoil dipole antenna coupled to the power supply;
a transmitter coupled to the power supply;
a receiver coupled to the power supply and configured to receive signals from remote transmitters at a designated frequency;
a computer processor coupled to the power supply;
a memory device coupled to the computer processor and configured to store an identifier associated with the apparatus;
one or more sensor devices that provide information regarding health status of a person or object;
logic instructions embedded on the memory device, the logic instructions configured to:
compare an identifier decoded from received signals to the identifier associated with the apparatus; and
when the identifier decoded matches the identifier associated with the apparatus;
decode a return frequency from the signal, and
generate return signals, wherein the return signals include the identifier associated with the apparatus, and the transmitter is activated only when the transmitter transmits the return signals at the return frequency;
wherein the return signals include an address of the apparatus as the identifier and information regarding a person or an object associated with the apparatus but not a physical location of the person or the object, wherein the information includes the information regarding health status of the person or object;
wherein the received signals include a wake up code, an encryption code, transmit data rate, operation mode, the identifier, and the return frequency; and
wherein the logic instructions are further configured to determine whether the apparatus was removed from the person or object and include data in the return signal that indicates whether the apparatus was removed from the person or object.

2. The apparatus of claim 1, wherein the transmitter is deactivated unless the transmitter is transmitting the return signals at the return frequency.

3. The apparatus of claim 1, wherein the transmitter transmits the return signals that includes the address, and information regarding the person or the object.

4. The apparatus of claim 1, wherein the receiver is a rake receiver including a plurality of sub-receivers that are delayed slightly from one another in order to tune in to multi-path components of the received signals.

5. The apparatus of claim 1, wherein the apparatus is smaller than one inch in length and one-quarter inch in width.

6. The apparatus of claim 1, wherein the logic instructions are further configured to receive and transmit voice data.

7. The apparatus of claim 1, wherein the apparatus operates after being swallowed by the person.

8. The apparatus of claim 1, wherein the apparatus transmits and receives signals in a frequency range from five hundred megahertz to one and one tenth (1.1) gigahertz.

9. The apparatus of claim 1, further comprising:
a turbo coder coupled to the power supply, the turbo coder operable to reduce error of the signals transmitted and received by the apparatus.

10. The apparatus of claim 1, wherein the transmitter transmits a return message that indicates the presence of a substance in an environment where the apparatus is located.

11. The apparatus of claim 1, further comprising a rake filter coupled to the power supply, the rake filter reducing the noise received by the apparatus.

12. The apparatus of claim 1, further comprising a turbo coder, the turbo coder increasing the accuracy of the signal received by the apparatus.

13. The apparatus of claim 1, wherein the logic instructions are further configured to determine whether the apparatus was removed from the person or object based on the information regarding health status of the person or object.

14. A system comprising:
an automated controller including logic instructions on computer readable media configured to:

store a database of addresses and corresponding transmission frequencies;

store identity information when a person or object is associated with one of the addresses;

receive an alert message if the person or object is reported missing, the alert message including the identity information for the person or object;

generate a message that includes a transmitter wake-up code, an encryption code, transmit data rate, operation mode, a return frequency, and one of the addresses that is associated with a capsule assigned to the person or object;

a transmitter to transmit the message at a designated frequency;

a receiver to receive response signals from the capsule at the designated frequency, and decode the address associated with the capsule from the response signals, wherein the response signals include information regarding the person or object but do not include a physical location of the person or object and wherein the information includes information indicating health status of the person or object wherein the information indicating health status of the person or object is generated by one or more sensor devices that provide the information regarding health status of the person or object; and the automated controller further including logic instructions on computer readable media configured to:

determine a location of the person or object based on time difference of arrival of the response signals; and decode the information regarding the person or object from the response signals; and wherein the logic instructions are further configured to determine whether the capsule was removed from the person or object and include data in the response signal that indicates whether the apparatus was removed from the person or object.

15. The system of claim 14, wherein the designated frequency is greater than five hundred (500) megahertz and less than one and one tenth (1.1) gigahertz.

16. The system of claim 14, wherein the logic instructions are further configured to decode the information indicating health status of the person or object.

17. The system of claim 14, wherein the logic instructions are further configured to decode data from the response signals, the data indicating whether the capsule associated with the person or object has been removed from the person or object.

18. The system of claim 14, wherein the logic instructions are further configured to generate a search pattern and to periodically transmit the message that includes the transmitter wake-up code and the address while the search pattern is executed.

* * * * *